United States Patent [19]

Majchrzak

[11] Patent Number: 4,591,956

[45] Date of Patent: May 27, 1986

[54] SUN VISOR FOR AUTOMOTIVE VEHICLES

[75] Inventor: Roland Majchrzak, Yutz, France

[73] Assignee: Gebr. Happich GmbH, Fed. Rep. of Germany

[21] Appl. No.: 660,935

[22] Filed: Oct. 15, 1984

[30] Foreign Application Priority Data

Nov. 5, 1983 [DE] Fed. Rep. of Germany ....... 3340068

[51] Int. Cl.⁴ ............................................. F21V 33/00
[52] U.S. Cl. ..................................... 362/144; 362/135
[58] Field of Search ................... 362/66, 74, 135, 141, 362/142, 144, 269, 287; 296/97

[56] References Cited

U.S. PATENT DOCUMENTS

| | | | |
|---|---|---|---|
| 2,046,393 | 7/1936 | Lewinsohn | 362/144 |
| 2,149,597 | 3/1939 | Girl | 362/144 |
| 3,543,018 | 11/1970 | Barcus | 362/144 |
| 4,000,404 | 12/1976 | Marcus | 362/135 |
| 4,075,468 | 2/1978 | Marcus | 362/144 |
| 4,174,864 | 11/1979 | Viertel | 362/144 |
| 4,203,149 | 5/1980 | Viertel | 362/144 |
| 4,306,276 | 12/1981 | Dick | 362/66 |
| 4,353,592 | 10/1982 | Cziptschirsch | 362/135 |
| 4,486,819 | 12/1984 | Marcus | 362/144 |
| 4,491,899 | 1/1985 | Fleming | 362/135 |

FOREIGN PATENT DOCUMENTS

| | | | |
|---|---|---|---|
| 877866 | 5/1953 | Fed. Rep. of Germany | 362/144 |
| 7908205 | 6/1979 | Fed. Rep. of Germany | 362/144 |
| 435797 | 5/1948 | Italy | 362/144 |

Primary Examiner—Carl Stuart Miller
Attorney, Agent, or Firm—Ostrolenk, Faber, Gerb & Soffen

[57] ABSTRACT

A sun visor for an automotive vehicle having a swivel bearing at one upper longitudinal edge region. The swivel bearing includes a non-metallic, plastic bearing part having a bearing borehole for the metallic sun-visor shaft and a parallel plug opening for an electric contact element. The electric contact element in the plug opening is connected to one of the wires from the light source which illuminates the mirror on the sun-visor body. A passage channel between the bearing borehole and the plug opening has a contact projection on the contact element biased through it to project into the bearing borehole and contact the shaft therein. The shaft has a recess extending partially around it at a region along it such that the contact projection will or will not make electric contact with the visor shaft depending upon the swivel position of the visor body. Shaped away from the bearing part on the upper longitudinal region of the visor body is an outer-support shaft which electrically connects with a housing part fastenable to the vehicle body. An electric wire to the light source connects to the outer-support shaft.

14 Claims, 4 Drawing Figures

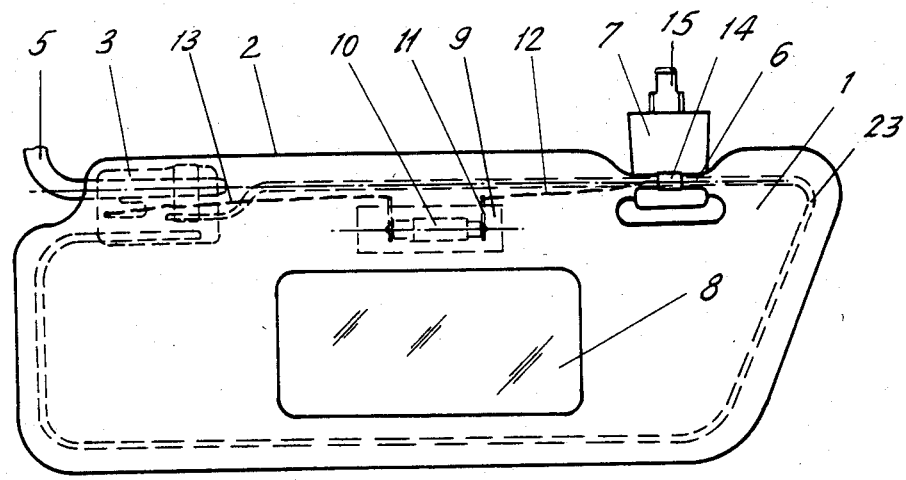
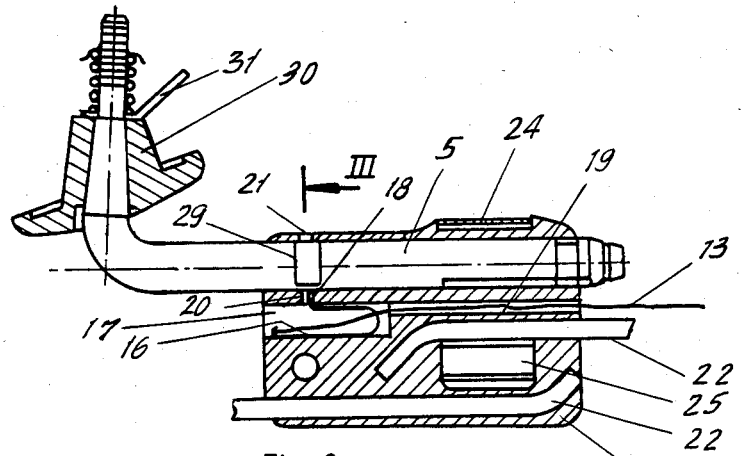
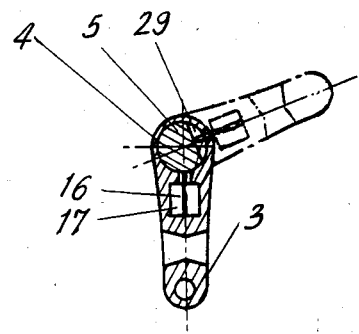
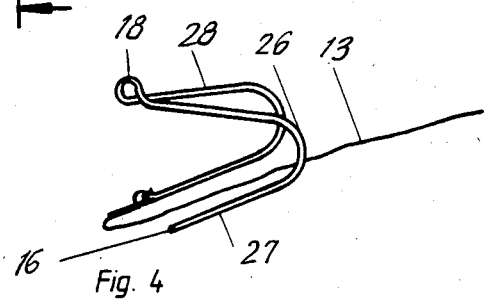
Fig. 1
Fig. 2
Fig. 3
Fig. 4

SUN VISOR FOR AUTOMOTIVE VEHICLES

BACKGROUND OF THE INVENTION

The present invention relates to a sun visor having an illuminated mirror on one surface of the sun visor body with an electrified light source adjacent the mirror, and more particularly to a system for electrically contacting with the light source located in the visor body.

A sun visor of this type is described in Federal Republic of Germany Pat. No. 27 03 447, which corresponds to U.S. Pat. No. 4,174,864. This patent discloses passing the electric current supply wires for the source of illumination associated with the mirror through the outer support of the sun visor. Conducting both the current feed wire and the ground wire through the outer support results in difficulties in manufacture and assembly, due to the lack of space available in the support and the necessity of insulating the corresponding contacts from each other. Furthermore, this arrangement is necessary only if the main swivel shaft of the sun visor is comprised of electrically non-conductive plastic. However, sun-visor shafts formed of steel rod are preferred by customers since their stability is substantially greater than sun-visor shafts formed of plastic. There is the possibility, also indicated in U.S. Pat. No. 4,174,864 of conducting the current feed wire through the outer support while using the main swivel shaft of the sun visor as the ground contact. However, Federal Republic of German Pat. No. 27 03 447 does not give any more detailed teaching as to a procedure for accomplishing this.

Federal Republic of Germany Utility Model No. 7 908 205 teaches a sun visor with an illuminating device, in which the ground contact is attached to the sun-visor shaft and the shaft, in turn, is connected in an electrically conductive manner to the body of the car. The sun-visor shaft in this case is a metal tube through which the current-conducting wire is passed. Toward its end that is contained within the sun-visor body, the sun-visor shaft has a bare region which is gripped around by a U-shaped contact spring. The bare region possibly extends only over a given region of the periphery of the shaft. The grounding contact is produced when a spring arm of the contact spring contacts the bare region of the shaft. This sun visor has the disadvantage that the supply of electric current for the illuminating device takes place through the swivel bearing. This makes it necessary to use a bored shaft of solid material or a shaft consisting of a tube, which naturally has less stability and is not easy to bend. Furthermore, there is the drawback that the contact spring grips over the free end of the sun-visor shaft. During the mounting of the sun-visor shaft, this arrangement does not prevent the contact spring from being displaced by the end of the shaft possibly striking against it. Such displacement could move the contact spring out of its position at which electric contact is possible. Furthermore, a contact spring which surrounds the sun-visor shaft appears rather expensive, due to its necessarily relatively large dimensions, particularly if the spring is made of non-ferrous metal in order to assure a good contact.

SUMMARY OF THE INVENTION

The primary object of the invention is to provide for a sun visor a simple and inexpensive contacting of the ground contact with the sun-visor shaft and for this sun visor to be easy to produce and mount and for the electrical contacting also to be dependable.

Another object of the invention is to develop the ground-contact element for the sun visor structurally simply and compact and to dependably protect it from damage.

A further object is to develop the sun-visor shaft such that no contact is made with the ground-contact element when the sun-visor body is in a selected position, e.g. of non-use.

In the sun visor according to the invention, the visor body has an upper longitudinal edge with a swivel bearing toward one end of the upper edge and an outer support toward the other end of the upper edge. The swivel bearing at the one end comprises a bearing part of non-metallic or plastic material which is formed with a first borehole for receiving the solid metal rod swivel shaft for the visor and is formed with a parallel plug opening having a first region or chamber of a larger cross-section for receiving an electric contact element which is joined with a smaller cross-section region through which one of the electric wires from the light source extends to the electric contact element. A small passage channel inside the bearing part extends between the bearing borehole and the plug opening.

An electric contact element is disposed in the plug opening and is electrically connected to one of the leads to the light source, specifically usually the ground lead wire. That contact element includes a spring loaded contact projection which extends through the passage channel from the plug opening and projects slightly into the bearing borehole where it would be biased into contact with the metallic shaft for establishing electrical contact therewith. In this way, the contact projection is protected inside the plastic bearing part against damage and bending. The sun-visor shaft, which is a solid length of round steel rod, has a recess defined in it in the shape of a circular segment which is located at the height of the passage channel and extends over a partial axial region of the shaft.

The outer support for the sun visor includes an outer support shaft on the visor body and a separate outer support housing attached to the vehicle body. Electric contact means on the outer support housing electrically contacts with the outer support shaft on the visor body and the outer support shaft on the visor body, in turn, is electrically connected with one of the terminals of the light source.

The bearing part could be a plastic injection molding. When the bearing part is formed, all of the bearing borehole, the plug opening, the passage channel between the borehole and the plug opening are formed during the molding. Also, where there is a stiffening wire frame in the visor body, the bearing part is injection molded including all of its openings directly on the stiffening wire frame.

The second lead wire, preferably the current feed wire, is conducted over the outer support. It is not necessary to use a bored sun-visor shaft or a sun-visor shaft in the form of a bent tube. The contact with the ground contact, on the other hand, takes place though the sun-visor shaft which is electrically connected with the body of the car. That shaft may consist of solid material despite the presence of a sun-visor illuminating device.

The plug opening in the plastic-bearing part does not cause any difficulties or added expense in manufacture. But, it permits rapid and simple plug mounting of the contact element. Because the contact projection of the contact element is arranged in a passage channel which is intended exclusively to receive it and because the contact projection extends only slightly at its free end, and under spring force, into the bearing borehole, it is permanently protected against all damage. Upon the insertion of the sun-visor shaft into the bearing borehole, the contact projection moves back against the spring force acting on it, whereby the projection cannot be bent or otherwise damaged by the sun-visor shaft. On the other hand, the contact projection is continuously urged by the spring force against the sun visor shaft and makes contact with its periphery, but not in the region in which the sun-visor shaft has a recess. That recess is provided in order to interrupt the contacting and thus the circuit when the sun visor is swung into the position of non-use, in which the visor is approximately parallel to the roof of the car. The contact element is advantageously of simple and compact construction since only a point or linear contact must be present on the sun-visor shaft for dependable contacting.

Other objects and features of the invention are described below with reference to the drawings.

BRIEF DESCRIPTION OF THE DRAWINGS

FIG. 1 is a view in elevation of a sun visor provided with the invention;

FIG. 2 is a section through the swivel bearing of the sun visor, on a scale substantially larger than that of FIG. 1;

FIG. 3 is a section along the line III—III of FIG. 2; and

FIG. 4 shows a contact element used with the invention.

DESCRIPTION OF A PREFERRED EMBODIMENT

The sun visor of FIG. 1 comprises a sun-visor body 1. Its upper longitudinal edge 2 has on one end region a swivel bearing which comprises a plastic-bearing part 3 with a bearing borehole 4 for receiving a metallic sun-visor shaft 5 inserted into it. At the other end region of the same longitudinal edge 2 of the body, there is an outer support comprised of outer-support shaft 6 and outer-support housing 7. The housing 7 is adapted to be fastened to the body of a vehicle. On that main surface of the sun-visor body 1 which in the downwardly swung condition of the sun visor faces the passenger compartment of the car, a mirror 8 is arranged. A source of light 10 is associated with the mirror. The light source of light is, for instance, a tubular light bulb.

For feeding electricity to the light 10, a current lead wire 12 is connected to one of the contacts 11 of the light bulb and a ground wire 13 is connected to the other contact 11. The current lead tire 12 is connected to an electric contact 14 seated on the outer-support shaft 6. The contact 14 makes contact with a mating contact (not visible) which is present in the outer-support housing 7. The contact lug 15 of the mating contact can be connected to the electric wires of the electrical system of the car. The ground wire 13 is connected to a contact element 16, which is shown in FIG. 4. The contact element 16 is disposed in a plug opening 17 of the plastic bearing part, and it makes contact with the sun-visor shaft 5 by means of a contact projection 18.

FIG. 2 shows the plastic material bearing part 3 and the entire surrounding region of the swivel bearing. The plastic bearing part 3 has a continuous bearing borehole 4 for the shaft 5. Beneath hole 4, spaced slightly from it and extending parallel to it, is the plug opening 17 for the contact element 16. The open side of the plug opening 17 is located on one lateral edge, here called the front, of the plastic bearing part 3. The plug opening 17 extends rearwardly part way toward the other lateral edge called the rear. The opening 17 is extended at its rear side by a channel 19 which opens freely at the other lateral edge, called the rear end, of the plastic bearing pedestal 3. The channel 19, which receives the ground wire 13, has a reduced cross-section opening, as compared with the plug opening 17. The opening 17, as seen in cross-section, is square so that an end stop, which limits the path of insertion, is obtained for the contact element 16.

The wall between the bearing borehole 4 and the plug opening 17 is interrupted by a passage channel 20 between them. This allows the contact projection 18 to act against the sun-visor shaft 5. The contact projection is in a protected arrangement in the visor body and/or that body creates for the contact projection 18 a passage which is protected from damage. For easy manufacture of the passage channel 20, the plastic bearing part 3 has a bore 21 which extends from its outer surface, traverses the bearing bore 4 and opens into the plug opening 17, and the lower region of the bore 21 forms the passage channel 20.

The plastic bearing part 3 is preferably formed by being injection molded onto the reinforcement frame 23 for the sun-visor body. That frame is formed of a length of wire 22 that passes around the visor body near its periphery for stiffening the sun-visor body 1. This makes it possible to fasten the wire ends of the reinforcement frame 23 easily to each other and also makes it possible to simultaneously develop all of the boreholes, channels and recesses 25 which are required for mounting a detent spring 24, which acts on the sun-visor shaft to control free swiveling of the visor body.

The contact element 16 may be produced from a sheet metal stamping or, as shown in FIG. 4, from a bent length of wire. The contact element 16 is developed, in the embodiment shown, as a spring 20 of approximately U or V shape, having double-arm spring legs 27 and 28. The free end region of the leg 28 has a bend which is directed away from the leg 27 and serves as the contact projection 18. The ground wire 13 is connected to the spring leg 27, which can be done, for instance, by soldering, clamping, or the like.

For installation, the ground wire 13 is passed through the channel 19, and the contact element 16 is pushed into the plug opening 17 until the contact projection 18 engages in the passage channel 20. The length of the contact projection 18 is great enough that its free end extends slightly into the bearing borehole 4. Excessive extension of the contact projection 18 into the bearing borehole 4 is prevented because the spring leg 28 of the contact element 16 rests against the wall of the plug opening 17 which is adjacent the bearing borehole 4. On the other hand, the depth of the penetration of the contact projection 18 into the bearing borehole 4 is selected so that, as a result of the spring force of the contact element or of the spring legs 27, 28, the projection presses with good contact against the sun-visor shaft 5, which is seated in the bearing borehole.

In the region of its contact with the contact projection 18, the sun-visor shaft 5 has a recess 29, shown in FIGS. 2 and 3, which is in the shape of a circular segment or arc and also extends over a short, partial axial region of the sun-visor shaft 5. The recess 29 is deep enough to interrupt the contact between the sun-visor shaft 5 and the contact element 18 and thus to disconnect the light source circuit when the sun visor is swung into its position of non-use. It is also possible to install a disconnect switch in the circuit, should it be desirable to disconnect the source of light when the sun-visor is in the position of use.

In order to improve the contact between the sun-visor shaft 5 and the vehicle body, a contact lug 31, which is adapted to be applied to the vehicle body, can be arranged on the swivel bearing housing 30. This serves for fastening the sun-visor shaft 5 to the body. The lug, of course, is in close contact with the sun-visor shaft 5.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A sun visor for an automotive vehicle, comprising:
   a visor body having opposite surfaces and having an upper longitudinal edge;
   a source of light supported at one of the visor body surfaces; an electric current lead wire connectable with the electrical system of the vehicle and connected with the light source; a ground wire also connected with the light source;
   a swivel bearing at the upper longitudinal edge of the body toward one side thereof; the swivel bearing comprising a bearing part of non-metallic material;
   a borehole in the bearing part for receiving a visor support shaft; a plug opening in the bearing part for receiving a contact element; a passage channel inside the bearing part extending between the borehole and the plug opening;
   an electrically conductive sun visor support shaft supported in the bearing borehole such that the visor body can swivel around the support shaft; one of the electric wires from the electric system of the vehicle being connected to the support shaft;
   a contact element in the plug opening; a spring-loaded contact projection on the contact element, and the projection protruding slightly into the bearing borehole through the passage channel, whereby the contact projection is protected inside the bearing part as it projects into the bearing borehole.
   the support shaft including a recess defined in it where the support shaft passes over the passage opening; the recess being deep enough that the contact projection does not contact the support shaft when the recess is over the contact projection.

2. The sun visor of claim 1, wherein the recess is of circular segment shape and also extends over only a partial axially extending region of the shaft.

3. The sun visor of claim 2, wherein the support shaft is a solid metal rod.

4. The sun visor of claim 1, further comprising an outer-support shaft also on the upper longitudinal edge of the visor body and spaced from the bearing part; an outer-support housing fastenable to the vehicle body and adapted for receiving the outer support shaft; the support housing including a contact element for an electric wire of the vehicle electrical system; the contact element being disposed for contacting the outer-support shaft; the current lead wire for the light source being electrically connected with the outer support shaft.

5. The sun visor of claim 1, wherein the plug opening has a wider cross-section region in which the contact element is positioned and has a smaller cross-section channel through which one of the wires from the light source passes to the contact element, and the smaller cross-section channel being sized for keeping the contact element in the wider cross-section region of the plug opening.

6. The sun visor of claim 5, wherein the plug opening extends parallel to the bearing bore hole, with the plug opening being open at one side of the bearing part for the wider cross-section region thereof and being open at the opposite side of the bearing part for the smaller cross-section channel.

7. The sun visor of claim 1, wherein the passage channel is defined by a second borehole which extends from the outside of the bearing part, through the bearing borehole, and through the bearing part, into the plug opening.

8. The sun visor of claim 1, wherein the sun-visor body has a central plane generally in which the plug opening and the bearing borehole are located, one below the other.

9. The sun visor of claim 1, further comprising a wire stiffening frame in the visor body; the bearing part including the bearing borehole, plug opening, and passage channel, being a directly injection molded part on the wire stiffening frame.

10. The sun visor of claim 1, wherein the plug opening has a non-circular cross-section opening for the contact element.

11. The sun visor of claim 1, wherein the contact element includes a spring arm which urges the contact projection into the bearing borehole and includes an arm of the contact element carrying the contact projection, the latter contact element arm resting against the wall in the bearing part defines the plug opening for supporting the contact projection in the passage channel.

12. The sun visor of claim 11, wherein the contact element is approximately U-shaped, with one of the arms thereof being the arm which carries the contact projection and the other arm thereof being the spring arm; the contact projection on the one arm being bent away from the other arm.

13. The sun visor of claim 12, wherein the contact element comprises a length of electrically conductive resilient wire which is bent into shape with the two arms and a contact projection.

14. The sun visor of claim 11, wherein the contact element comprises a length of electrically conductive resilient wire which is bent into shape with the two arms and a contact projection.

* * * * *